Oct. 8, 1957  R. F. BERAN  2,808,694
COTTON STRIPPER WITH MOVING COMB
Filed Nov. 7, 1955  3 Sheets-Sheet 1

INVENTOR.
Rudolph F. Beran
BY
Shoemaker & Mattare
ATTYS.

INVENTOR.
Rudolph F. Beran

Oct. 8, 1957 — R. F. BERAN — 2,808,694
COTTON STRIPPER WITH MOVING COMB
Filed Nov. 7, 1955 — 3 Sheets-Sheet 3

INVENTOR.
Rudolph F. Beran
BY
Shoemaker & Mattare
ATTYS.

United States Patent Office

2,808,694
Patented Oct. 8, 1957

2,808,694

COTTON STRIPPER WITH MOVING COMB

Rudolph F. Beran, Temple, Tex.

Application November 7, 1955, Serial No. 545,404

6 Claims. (Cl. 56—35)

This invention relates generally to harvesting machines and more particularly to an improved form of cotton picker or harvester.

One object of this invention resides in the provision of an improved type of cotton picking mechanism which is of simplified yet effective construction and in which the number of operating parts has been reduced to a minimum so as to enchance the durability and longevity of the device.

Another object of this invention resides in the provision of a pair of trough-like members adapted for attachment to an associated powered vehicle such as a tractor, with such troughs disposed in rearwardly inclined relation with their forward ends disposed in close relationship to the ground surfaces so as to straddle a row of the crop to be harvested and in which each trough has associated therewith along the inner side thereof a rotatable cylinder, the cylinder being provided with a series of longitudinally spaced apertures through which picking fingers are projected, the picking fingers being rotatably mounted about an axis within the cylinder which is disposed eccentrically with relation to the longitudinal rotational axis of the cylinder.

Another object of the invention lies in the provision of a machine of the character described in the preceding paragraph wherein the cylinders are mounted in close adjacency to the inner walls of each trough and wherein such inner walls are cut away along the length of the cylinders such that the lower edge defining the cut away acts to wipe off the picked bolls of cotton as the same are carried into the confines of the trough by the picking fingers, the reciprocating motion of the picking fingers with respect to the cylinders as affected by the eccentricity of the respective rotational axes being so related that the fingers are receding as they pass by the aforementioned lower edges of the cut away portions to aid in the wiping action afforded thereby.

Still another object of this invention is to provide an improved cotton picker assembly wherein a pair of trough members are mounted on a powered vehicle, such as a tractor with the troughs being rearwardly inclined and having their lower forward ends disposed in close adjacency to the ground surface whereby the troughs may straddle a crop row to be harvested and wherein each trough has associated therewith a rotatable cylinder having picking fingers projecting therefrom, the fingers being rotated on axes which are eccentrically disposed with relation to their associated cylinders so that as the cylinders rotate the fingers will effect a reciprocating motion with respect thereto and wherein conveying means are associated with each trough member, there being a common drive to the conveying means adapted for attachment to the power take off of the associated tractor and wherein the conveying means is so constructed with relation to the rotatable cylinders as to be drivingly connected therewith to impart the rotary motion to the cylinders.

Another object of the invention is to provide an improved cotton picker of the character described wherein each trough has a series of openings in its bottom wall and has associated with each opening a pivotal slat member having teeth-like projections along one edge so that the slats may be pivotally adjusted to raise or lower such teeth-like projections into more or less close adjacency with the conveying mechanism so as to impart a cleaning and refuse separating action upon the harvested cotton as the same is conveyed up the conveyor troughs and out from the elevated rear ends thereof from whence the harvested crop is discharged into a suitable receptacle.

Another object of this invention is to provide an improved cotton picker in conformity with the preceding objects wherein brush members are associated with the troughs in such a manner as to catch and retain any bolls that may pass through the fingers and retain such bolls in a position that they may be later picked up by the fingers and transferred to the troughs.

Another object of the invention resides in the provision of a cotton picker of the character described wherein brush members are provided in the path of movement of the picking fingers so as to aid in the wiping of such fingers as the crop is transferred into the troughs.

With the above and other objects in view, the invention consists in the construction and novel combination and arrangement of parts hereinafter fully described, illustrated in the accompanying drawings and pointed out in the claims hereto appended, it being understood that various changes in the form, proportions, and minor details of construction, within the scope of the claims, may be resorted to without departing from the spirit or sacrificing any of the advantages of the invention.

Figure 1:
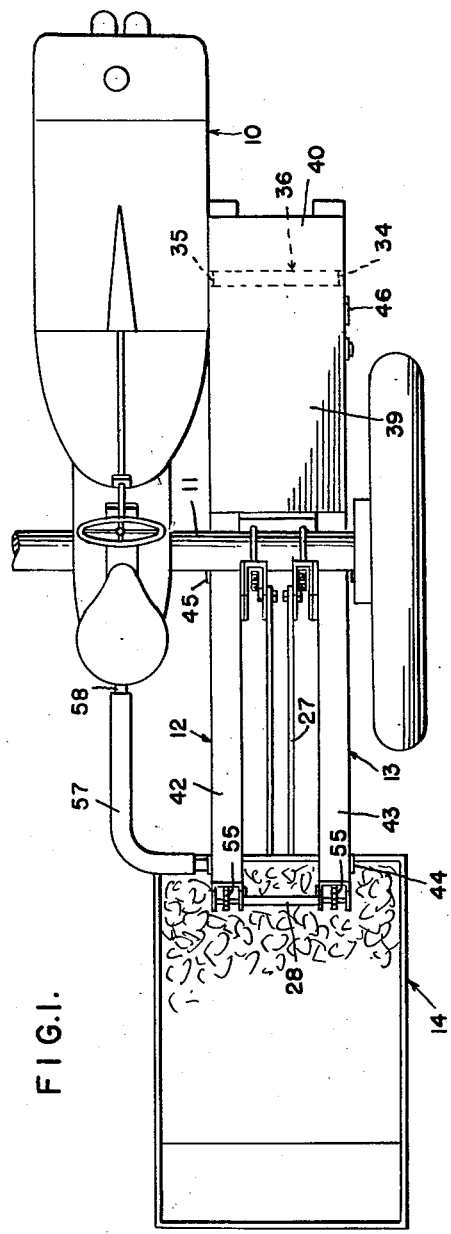
Fig. 1 is a fragmentary plan view showing the improved cotton picker mounted on an associated tractor.
Figure 2:
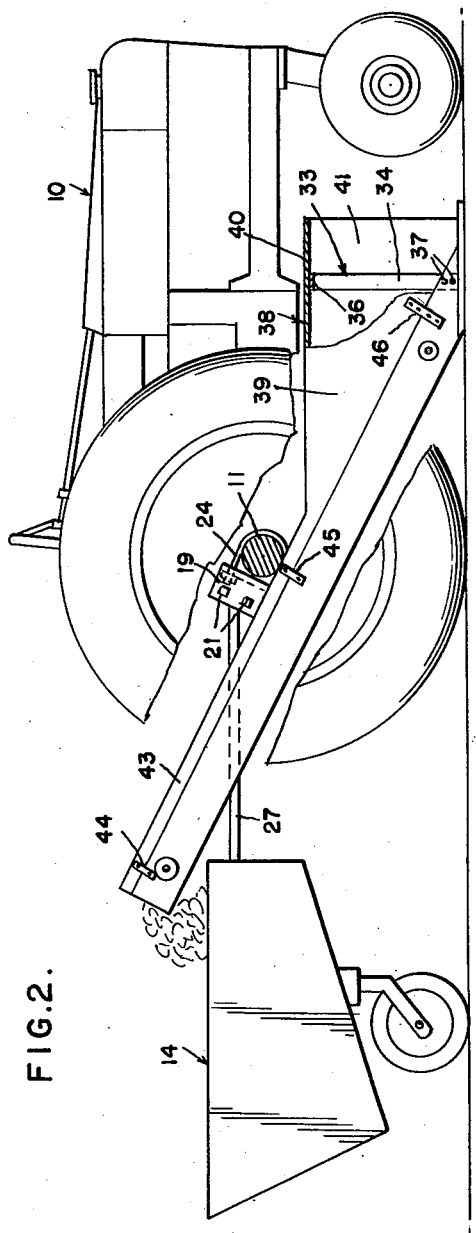
Fig. 2 is a side elevational view of the assembly shown in Fig. 1 with parts of one tractor wheel broken away to more clearly show the cotton harvester.

Referring now more particularly to Figs. 1 and 2, the reference character 10 indicates generally a powered vehicle, such as a tractor with which the improved picker assembly is operatively associated. The tractor is of conventional construction and includes the rear axle housing member 11 to which the picker assembly is mounted in the manner hereinafter described. The picker itself consists essentially of the two trough assemblies 12 and 13 which are disposed in spaced parallel relationship and which when mounted on the tractor are disposed in rearwardly inclined relationship such that their forward ends are disposed in close adjacency with the ground surface so as to straddle and operate upon the crop row which is to be harvested and such that their rear ends are elevated a sufficient amount as to permit the harvested cotton to fall or drop into a suitable receptacle such as that indicated by the reference character 14.

The receptacle 14 may be of any desired character and is attached to the powered vehicle in towed relation thereto. This invention envisages the provision of a towing attachment for such receptacle by mechanism which at the same time accomplishes the connection of the cotton picker to the rear axle housing 11 of the tractor.

The troughs include outer walls 15 and 15' and inner walls 16 and 16' as well as bottoms 17 and 17' interconnecting the same and each inner wall 16 is provided with a bracket member 18, 18' which includes a vertical strap portion 19, 19', each of which is secured to the associated inner wall 16, 16' by means of fasteners 20, 20' and which has secured adjacent its upper ends by fasteners 21, 21' the L-shaped piece having one leg 22, 22' abutted against the strap 19, 19' and through which the fasteners 21, 21' pass and which also includes the laterally inwardly extending leg portion 23, 23' which is provided with a pair of spaced apertures through which the U bolt member 24, 24' passes. In this manner, the leg 23, 23' is abutted against the axle housing 11 and the U bolts 24, 24' pass therearound and secured in place to rigidly affix the picker assembly to the tractor as will be seen most clearly in Figs. 3 and 4. The free end edge of each leg 23, 23' is provided with a plate member 25, 25' which carries a pivot bolt member 26, 26' which is adapted to be passed through suitable apertures provided for this purpose in the free ends of the draft arms 27 of the receptacle 14. In this manner, the structure which serves to fixedly secure the cotton picker to the tractor also serves the purpose of hitching the receptacle 14 in towed relation behind the picker and in such a position as to receive the material discharged from the conveyor means within the troughs 12 and 13.

Figure 3:
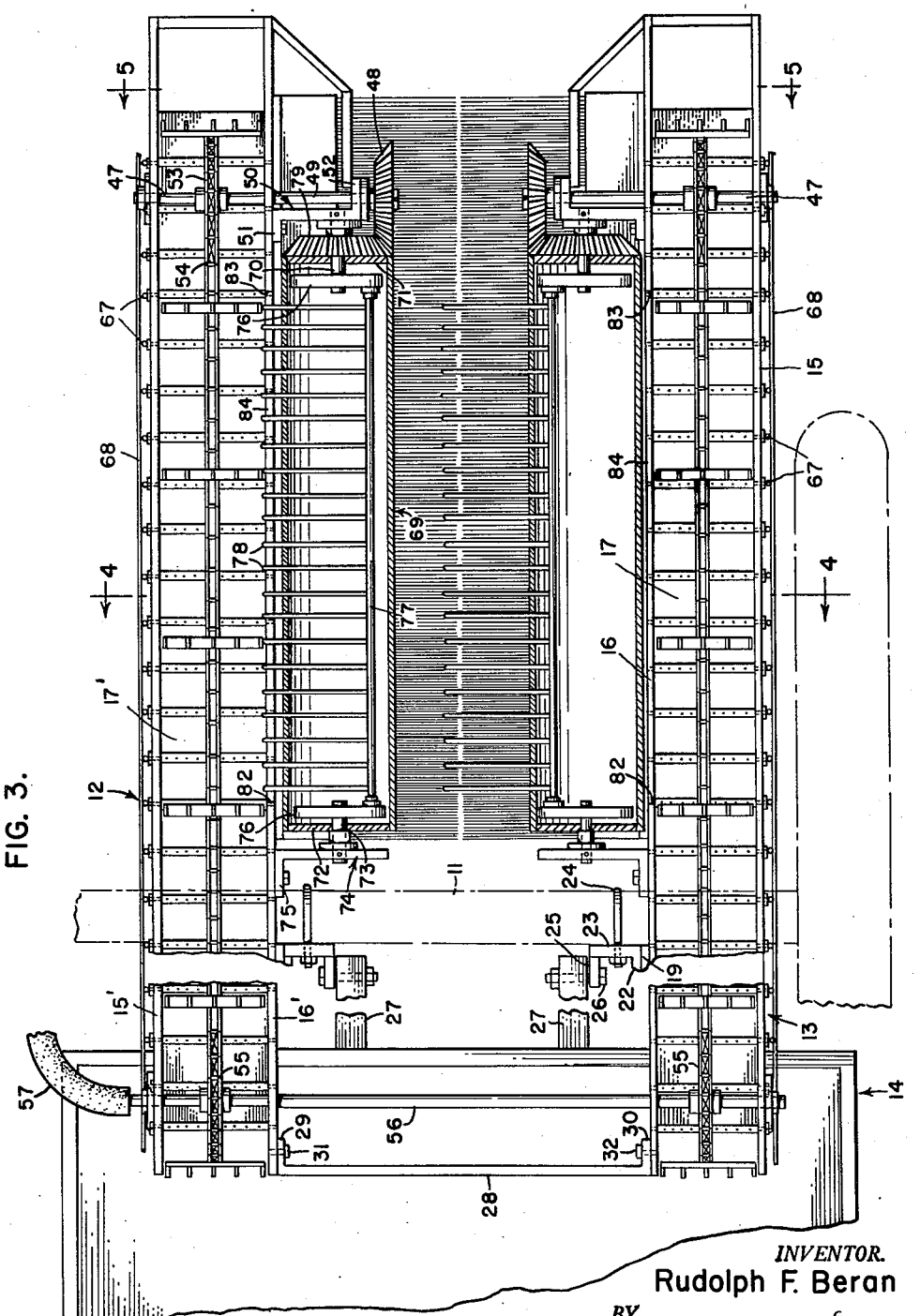
Fig. 3 is an enlarged fragmentary plan view of the picker assembly with parts thereof broken away and shown in section and having certain elements omitted therefrom for clarity.

The troughs are rigidly interconnected at their upper rear ends by means of the channel shaped cross piece 28, the same being most clearly shown in Fig. 3 wherein it will be apparent that the laterally projected end portions 29 and 30 thereof are rigidly affixed to the inner walls of the troughs by means of the fasteners 31 and 32 respectively. The lower forward ends of the troughs are rigidly interconnected by means of the brace member 33 which is of arched configuration and which includes the vertical side straps 34 and 35 interconnected at their upper ends by the cross piece 36, the lower ends of the vertical straps 34 and 35 being rigidly secured as by fasteners 37 to the troughs.

Aside from the rigidifying feature of the member 33, the same provides a support for the hood assembly indicated generally by the reference character 38. Preferably, the hood has a forward portion 39 disposed generally forwardly of the rear axle housing 11 which includes a horizontal roof portion 40 disposed at a sufficient distance above the ground surface to clear the crop row being straddled and operated upon by the picker and which has an opening 41 in its forward end to permit the crop to pass thereinto as will be readily apparent from a study of Fig. 2. Just forward of the rear axle assembly 11, the hood is divided into two separate sections 42 and 43 which serve respectively as covers for the troughs 12 and 13 and which are rigidly affixed thereto as by the strap fasteners 44 and 45, the portion 39 being secured to the troughs by the strap fasteners 46.

Figure 4:
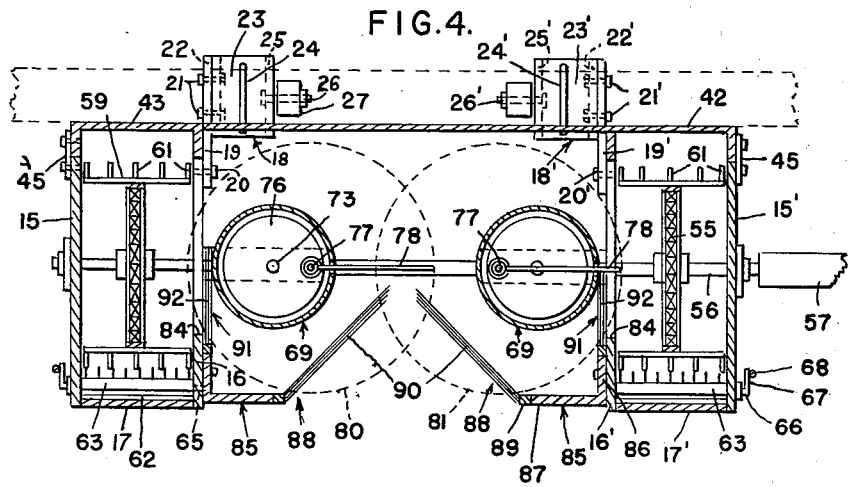
Fig. 4 is a transverse sectional view taken substantially along the plane of section line 4—4 of Fig. 3 and showing details of internal construction.
Figure 5:
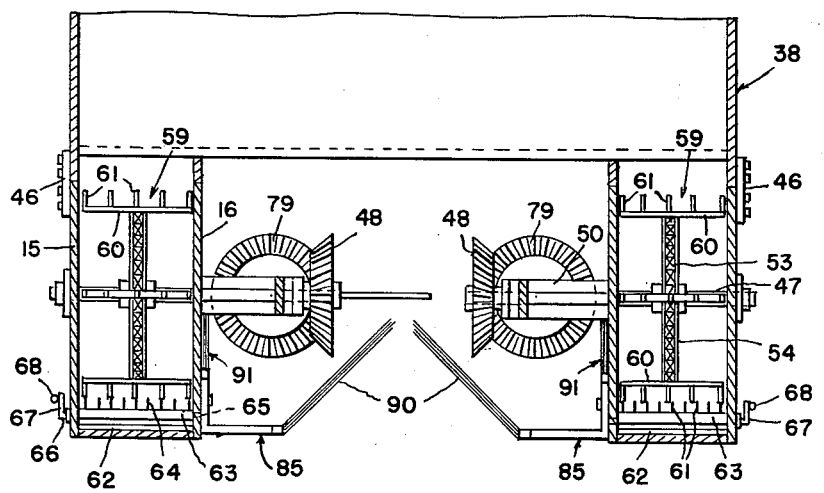
Fig. 5 is a transverse sectional view taken substantially along the plane of section line 5—5 of Fig. 3, showing tails of the drive arrangement.

Each trough has a conveyor means associated therewith as will be seen most clearly in Figs. 3, 4 and 5. The conveyor means for the two troughs are identical and for the purpose of description only one will be specifically referred to. Journaled adjacent the lower end of each trough is a first shaft member 47, this shaft being disposed at right angles to the longitudinal axes of the trough and being journaled in the outer and inner walls 15 and 16 thereof by any suitable bearing means. Each such shaft 47 is of sufficient length as to extend beyond the inner wall 16 a predetermined distance and which has secured at such inner free end a bevel gear member 48, the purpose of which will be presently apparent. To properly support this shaft extension which, for the purpose of clarity, is illustrated by the reference character 49, an outboard bearing bracket 50 is provided. This bracket may be of any desired shape but in the specific illustration shown in Fig. 3, for example, it is of Z-shaped configuration having one leg 51 attached to the inner panel or wall 16 and having its outer leg 52 carrying a suitable bearing or bushing for journaling the shaft extension 49 and imparting rigidity thereto.

Mounted on the shaft 47 substantially midway between the outer and inner panels or walls 15 and 16 is a sprocket wheel 53 which has a chain member 54 trained thereabout with the lower flight thereof disposed in spaced relation above the bottom wall 17 of the trough. A second sprocket member 55 is mounted adjacent the rear end of the trough on a drive shaft member 56 which extends through both the outer and inner walls of each of the trough members and is thus common to both of the sprockets 55 in the two troughs. The drive shaft 56 is adapted for attachment to a flexible drive shaft member 57 which extends therefrom to the power take off shaft 58, see particularly Fig. 1, of the tractor 10 or similar powered vehicle. Thus the drive shaft 56 through the medium of a flexible coupling element 57 imparts rotary motion to both of the sprockets 55 and consequently causes movement of the chains 54 in each trough. It is important to note that the direction of rotation of the sprockets 55 is such as to cause the lower flights of the chains 54 to move in a direction to the left in Fig. 3, for example, or in other words, from the forward toward the rearward ends of the troughs.

Each chain 54 has provided at spaced points therealong with transverse rake members 59 each of which includes a transverse body portion 60 attached directly by any suitable means to its associated chain and which has provided at spaced points therealong with vertically projecting rake fingers 61, the purpose of which will be presently apparent.

Figure 6:
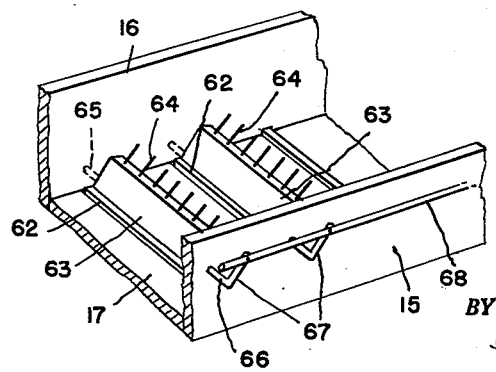
Fig. 6 is a prospective view showing details of one of the trough assemblies.

The bottom 17 of each trough is divided up into a plurality of fixed and movable plates 62 and 63 which are alternately disposed as will be seen most clearly in Fig. 6, the movable plates having a plurality of spines or needle-like projections 64 affixed to one transverse edge thereof and these plates extend between the opposed wall surfaces of the outer and inner panels or walls 15 and 16 and are pivotally attached along their longitudinal center lines by means of projecting pins 65 and 66 which extend through the inner and outer panels or walls 15 and 16. Each of the pins 66 terminates in an upturned arm portion 67 and all of these arm portions are pivotally connected to a link member 68 connected to any suitable manual control means so that the angularity of the movable plates 63 may be adjusted as desired. Of course, the movable plates 63 are movable between the position which affords substantially no opening through the bottom of the troughs to a position in which they afford a maximum opening through the troughs. Also, as the plates are moved between such positions, the spines 64 are moved into closer relationship with the rake fingers 61 previously described and the rake fingers cooperate with the spines to aid in cleaning the bolls of cotton as they are transported upwardly in the trough members, while at the same time the movable plates afford sufficient opening to permit trash and rubbish to fall through the bottoms of the troughs and to the ground surface.

Mounted along the inner side of each trough outwardly of the inner panel or wall thereof is a cylinder member indicated generally by the reference character 69. The previously mentioned Z bracket 50 has a stub shaft 70 rigidly affixed thereto which projects through one end wall 71 of its associated cylinder and the opposite end wall 72 of the cylinder has associated therewith a stub shaft 73 which is fixed to an L-shaped bracket member 74 having one leg 75 thereof fixed rigidly to the inner wall 16 of its associated trough. Both of the stub shafts 70 and 73 project through the center of the end walls 71 and 72 and journal the cylinder thereon about its longitudinal center line. Each cylinder 69 is of hollow construction and each stub shaft 70 and 73 has rigidly affixed to its inner end a disc member 76, which disc is held in fixed relation with respect to the rotatable cylinder. An elongate rod 77 is journaled at opposite ends between the two discs 76 and is free to rotate relative thereto about an axis which is eccentrically disposed with respect to the rotational axis of the cylinder and in the preferred embodiment as is illustrated in Fig. 4, the two rods 77 are rotatable about axes which are coplanar with the axes of the two cylinder members 69. Rigidly affixed to each of the troughs are a plurality of longitudinally spaced picking fingers 78 which are of sufficient length as to project through a series of longitudinally spaced apertures provided in the wall of their associated cylinder 69.

Rigidly affixed to the outer side of the end wall 71 of each cylinder 69 is a bevel gear 79 which is in mesh with the previously mentioned bevel gear 48 affixed to the sprocket shaft 47. Thus it can be seen rotation of the drive shaft 56 for operating the conveyor means within each trough also effects rotation of the associated cylinders 69. Of course, the bevel gears 79 are freely rotatable on the stub shaft 70 since it is necessary for proper operation that the stub shafts be stationary.

Since the stub shafts 70 and 73 and consequently the discs 76 are stationary, while the cylinders 69 rotate, the picking fingers 78 will be constrained to rotate about the longitudinal axis of the rods 77 and describe the arcs illustrated by dotted lines 80 and 81 in Fig. 4 and it will be seen that the movement along the arc 81 will be in a clockwise direction, whereas the movement along the arc 80 will be counterclockwise.

The inner wall 16 of each trough is cut away substantially along the entire length of each cylinder as, for example, by the points designated by the reference characters 82 and 83 in Fig. 3 and between these points is defined an upper edge 84 of each inner wall which is of reduced height within this region. The lengths of the picking fingers 78 are such that as they are constrained to follow their arcs, they just clear the aforementioned edges 84 and hence will be effective to deposit material gathered thereby within the confines of the troughs. To aid in this depositing, each trough inner wall 16 is provided thereon throughout the length of the cylinders 69 with angle bracket members 85, each of which includes an upstanding leg portion 86 rigidly secured to the inner panel or wall and an outstanding or laterally projecting leg 87 which extends in spaced relation below the associated cylinder 69. To the free edge of the lateral arm 87 of each bracket 85 is affixed a brush assembly indicated generally by the reference character 88. These brushes may conveniently take the form of a base portion 89 secured directly to the free edge of the lateral arm 87 and within which are embedded bristles 90. The bristles are so disposed as to extend upwardly in longitudinally inwardly inclined relation in the manner shown most clearly in Figs. 4 and 5 and to be within substantially their entire lengths the path of movement of the respective picking fingers 78, whereby such picking fingers are forced to sweep through the brushes. The purpose of the brushes 88 is to retain any material which may fall from the fingers and hold it in position so that it may subsequently be picked up by the fingers as they sweep therethrough. In the specific embodiment shown, the fingers 78 are disposed in opposite phase relationship, that is, the picking fingers 78 on the cylinder 69 in the left of Fig. 4 are projected the maximum extent outwardly of the associated cylinder and in a position for sweeping up or picking the cotton bolls from the plant, whereas the fingers 78 on the right hand cylinders 69 are in the fully retracted position in respect to their associated cylinder and are in the process of depositing the picked bolls into the troughs.

To aid in the cleaning operation of the fingers 78 as they deposit their material into the trough, secondary brushes 91 are provided along the free edge of each upstanding arm portion 86 of the angle brackets 85. These brushes 91 are of similar construction to those previously described but the bristles 92 thereof are vertically disposed and are in the path of movement of the fingers 78 as will be clearly evident and will serve to strip off any material remaining on the exposed ends of the fingers 78 as they are swept therethrough.

Due to the eccentricity between the rotational axes of the cylinder on the one hand and the picking fingers 78 on the other hand, the picking fingers will have a reciprocatory motion with respect to the cylinders and will progressively and continually be projected and retracted with respect to the cylinders, the fingers being in the process of proceeding to their point of maximum projection while passing through the bristles 90 and while engaging and stripping off bolls of cotton from the crop and will be in retracting relationship as the fingers are moved into a position such as that shown in the right hand cylinder 69 in Fig. 4, at which time any material carried thereby will be dumped into the associated trough, immediately subsequent movement being through the bristles 92 to effect the final cleaning thereof even though during this immediately subsequent movement the fingers will begin in projecting relationship with respect to the cylinder.

I claim:

1. In a cotton picking machine comprising a pair of spaced, parallel and rearwardly inclined troughs, each trough including an outer wall, an inner wall and a bottom, a cylinder rotatably mounted on each trough adjacent to but outwardly of the inner wall thereof and each inner wall having a portion along the length of the associated cylinder which is of reduced height, a rod rotatably mounted within each cylinder about an axis eccentric but parallel to the rotational axis of the cylinder, a plurality of coplanar, laterally directed picking fingers rigid with each rod and projecting through the cylinder whereby rotation of the cylinders effects reciprocation of the rods with respect thereto, said fingers being of such length as to sweep past and in close adjacency to the upper edge of said inner wall portion whereby to clear gathered material from the fingers, and there being a brush member secured to said inner wall portion at the upper edge thereof and through which said fingers sweep.

2. In a cotton picking machine comprising a pair of spaced, parallel and rearwardly inclined troughs, each trough including an outer wall, an inner wall and a bottom, a cylinder rotatably mounted on each trough adjacent to but outwardly of the inner wall thereof and each inner wall having a portion along the length of the associated cylinder which is of reduced height, a rod rotatably mounted within each cylinder about an axis eccentric but parallel to the rotational axis of the cylinder, a plurality of coplanar, laterally directed picking fingers rigid with each rod and projecting through the cylinder whereby rotation of the cylinders effects reciprocation of the rods with respect thereto, said fingers being of such length as to sweep past and in close adjacency to the upper edge of said inner wall portion whereby to clear gathered material from the fingers, and there being a brush member secured to said inner wall portion at the upper edge thereof and through which said fingers sweep, and secondary brush members secured to each trough below the cylinders and disposed in upwardly inclined relationship, said secondary brush members being in the path of movement of said fingers whereby material falling from the fingers will be suspended by the secondary brushes to be subsequently picked up by the fingers.

3. In a cotton picking machine comprising a pair of spaced, parallel and rearwardly inclined troughs, each trough including an outer wall, an inner wall and a bottom, a cylinder rotatably mounted on each trough adjacent to but outwardly of the inner wall thereof and each inner wall having a portion along the length of the associated cylinder which is of reduced height, a rod rotatably mounted within each cylinder about an axis eccentric but parallel to the rotational axis of the cylinder, a plurality of coplanar, laterally directed picking fingers rigid with each rod and projecting through the cylinder whereby rotation of the cylinders effects reciprocation of the rods with respect thereto, said fingers being of such length as to sweep past and in close adjacency to the upper edge of said inner wall portion whereby to clear gathered material from the fingers, and there being a brush member secured to said inner wall portion at the upper edge thereof and through which said fingers sweep, each trough having a conveyor mechanism therein, each conveyor mechanism including a pair of spaced sprockets, a chain trained about said sprockets, and rake means carried by said chain, power take-off means drivingly connected to one sprocket of each pair, and means drivingly connecting the other sprocket of each pair to one associated cylinder whereby the cylinders are driven by the conveyor means.

4. A cotton picker comprising a pair of spaced, parallel, elongated troughs having means thereon for attaching the same in rearwardly inclined relation to a powered vehicle such as a tractor with the forward ends of the troughs disposed in close adjacency to the ground surface for straddling a crop row, each trough including inner and outer panels or walls and a bottom, a hollow cylinder operatively associated with and rotatably mounted along but outwardly of the inner panel of each trough with such cylinders being disposed in spaced parallelism to straddle and operate upon the crop row, a conveyor disposed within each of said troughs including sprockets located adjacent opposite ends of each trough, a shaft journaled through the inner and outer panels of each trough upon which that sprocket disposed adjacent the lower end of the trough is mounted, a common drive shaft projecting between and journaled through the inner and outer panels of both troughs at the other end thereof and upon which both the uppermost sprockets are mounted, an endless chain trained about each pair of sprockets, and rake members secured at spaced points along each chain, the bottom of each trough having transverse openings therein and including movable slat members to vary the extent of the openings, a bevel gear rigidly mounted on the lower end of each cylinder and each of the first mentioned shafts having drive bevel gears rigid therewith and engaged with the first mentioned bevel gears, a rod mounted within each cylinder in offset relation to the longitudinal axes thereof, and a plurality of picking fingers rotatably carried by each rod and projecting through each associated cylinder.

5. In the cotton picker as defined in claim 4 wherein the means mounting the cylinders upon the troughs includes a pair of stub shafts upon which the opposite ends of each cylinder is journaled, said stub shafts projecting into each cylinder, a disc rigid with each stub shaft inside the associated cylinder, and said rod upon which the picking fingers are mounted being rotatably carried between each pair of discs.

6. In the cotton picker as defined in claim 3 wherein each conveyor is mounted upon its associated trough by means of a pair of non-rotatable stub shafts carried by the associated trough projecting through the opposite ends of the cylinder, said means for rotatably mounting the picking fingers including a disc rigid with each stub shaft and fixed thereto within the associated cylinder, and a rod for each cylinder carried between said discs and upon which the picking fingers are mounted.

References Cited in the file of this patent

UNITED STATES PATENTS

| 1,006,614 | Willis et al. | Oct. 24, 1911 |
| 1,069,997 | Appleby | Aug. 12, 1913 |
| 1,105,235 | Appleby | July 28, 1914 |
| 1,802,022 | Johnston et al. | Apr. 21, 1931 |
| 1,933,922 | Morse | Nov. 7, 1933 |
| 2,001,077 | Thomann | May 14, 1935 |
| 2,677,227 | Caldwell | May 4, 1954 |